United States Patent [19]
Nakagawa

[11] Patent Number: 5,455,961
[45] Date of Patent: Oct. 3, 1995

[54] TELECOMMUNICATION SYSTEM WITH INCREASED CHANNELS BY USE OF ORBITING COMMUNICATION SATELLITES

[75] Inventor: Osamu Nakagawa, Tokyo, Japan

[73] Assignee: NEC Corporation, Tokyo, Japan

[21] Appl. No.: 41,194

[22] Filed: Apr. 1, 1993

[30] Foreign Application Priority Data

Apr. 1, 1992 [JP] Japan .................................. 4-109014

[51] Int. Cl.$^6$ ............................ H04B 1/10; H04B 17/00; H04B 7/185; H04J 3/06
[52] U.S. Cl. ........................... 455/12.1; 455/62; 455/63; 455/67.6; 370/104.1; 342/358
[58] Field of Search ................... 455/12.1, 13.1, 455/13.2, 62, 63, 67.6, 52.1; 342/357, 352, 358; 370/104.1

[56] References Cited

U.S. PATENT DOCUMENTS

| | | | |
|---|---|---|---|
| 3,879,581 | 4/1975 | Schlosser et al. | 455/13.2 |
| 4,191,923 | 3/1980 | Schelisch | 455/13.2 |
| 5,095,538 | 3/1992 | Durboraw, III | 370/104.1 |

FOREIGN PATENT DOCUMENTS 0117224  5/1991  Japan ................................ 455/13.2

OTHER PUBLICATIONS

D. W. Davies, et al., "Computer Networks and Their Protocols", Corona Corp. Japan, Aug. 10, 1986, pp. 90–117.
J. M. Radbone, "UoSAT: A Decade of Experience Pioneering Microsattelites", Symposium International Small Satellite Systems and Services, Jun. 6–Jul. 3, 1992, pp. 1–9.

Primary Examiner—Chi H. Pham
Assistant Examiner—Mark D. Wisler
Attorney, Agent, or Firm—Foley & Lardner

[57] ABSTRACT

An orbiting satellite-based telecommunication system for providing store and forwarding service by having a ground station, in response to an instruction from an orbiting satellite over a specific communication channel of the down link, supply transmit data to the orbiting satellite through an unused one of a plurality of communication channels of the up link in accordance with a packet protocol, and having the ground station in response to another instruction from the orbiting satellite through the down link, receive the transmit data from the orbiting satellite through an unused one of said plurality of communication channels in accordance with the protocol wherein said orbiting satellite is provided with a divider for dividing the frequency band of the up link into a plurality of subchannels on the basis of the Doppler shift amount due to variations in the distance between a terminal and the orbiting satellite; a demodulator for demodulating the transmit data on a subchannel-by-subchannel basis; and data processor for processing said transmit data, demodulated on a subchannel-by-subchannel basis, by a predetermined procedure.

8 Claims, 5 Drawing Sheets

TELECOMMUNICATION SYSTEM WITH INCREASED CHANNELS BY USE OF ORBITING COMMUNICATION SATELLITES

BACKGROUND OF THE INVENTION

1. Field of the Invention

The present invention relates to a telecommunication system using orbiting satellites, and more particularly to a telecommunication system of this kind whose communication channels are increased by using carrier frequency shifts by the Doppler effect.

2. Description of the Prior Art

The development of satellite communication systems up to date has heavily relied on geostationary satellites. Geostationary satellites, which are launched to an altitude of 36,000 km over the equator, require large launching vehicles and accordingly are expensive to launch. Many such satellites have already been launched by a number of countries, leaving a relatively few positions available for additional geostationary orbits. Moreover, since they are extremely far from ground stations and accordingly entail great path loss, they require large-scale transmitters and receivers. For these reasons, conventional satellite communication systems are unable to meet the significantly growing demand for personal communication.

Against this background, telecommunication systems using low-altitude orbiting satellites have come to attract interest. A first advantage of telecommunication using low-altitude satellites is a lower cost per launching attempt because of the relatively small size of the launching vehicle. Therefore, the economic risk of launching failures has been reduced, making it feasible to launch many small orbiting satellites. The limitation on the service areas of low-altitude orbiting communication satellites by their low altitude can be offset by launching a greater number of satellites. A second advantage consists in the ability to provide low-cost store and forwarding service using a few satellites where no real time communication is required (e.g. where communication is to take place between two points having a 180° difference in longitude or a 12-hour time difference). A third advantage derives from the smaller distance of the orbiting satellite than of the geostationary satellite from the ground station, allowing the ground station to be smaller, so that the demand for personal communication can be more readily met.

To provide the aforementioned low-cost store and forwarding service using a small number of orbiting satellites, it is more advantageous to directly link individual ground stations and the satellites by communication lines. If another ground station for the relaying purpose, such as a gateway, is provided, the cost will correspondingly increase. Examples of such a low cost satellite communication system include the ALOHA system having competitive control means (see the Japanese version Of D.W. Davies, D.L.A. Barber, W.L. Price, C.M. Solomonides "Computer Networks and Their Protocols", Aug. 10, 1986, Corona Corp. Japan). Example of a store and forwarding orbiting satellite communication system, using the same competitive control means as in the ALOHA system, include the JAPAN Amateur Satellite-1 (JAS-1), JAS-1b and UoSAT of the University of Surrey, U.K. (see J.M. Radbone, "UoSAT: A Decade of Experience Pioneering Microsatellites", the Symposium International Small Satellite Systems and Service, June, 29–Jul. 3, 1992, Arcachon, France).

In the store and forwarding system using this ALOHA system, since communication requirements in a given geographical area concentrate, along with the orbiting of the satellite, in the visible period of the satellite during which the area comes into the coverage of the satellite (about one hour a day), many more communication channels should be available than in the conventional geostationary satellite-based real time communication system. Thus, if the number of communication demands is the same, the number of communication channels available for the store and forwarding system should be 24 times as great as in the case of the geostationary satellite based real time communication system.

In this store and forwarding system, furthermore, as the distance of the satellite from the ground varies more (6 km/sec), there occur Doppler shifts in receive carrier frequency both at the ground station and at the satellite, and accordingly an allowance for these Doppler shifts should be made in the allocation of frequency channels. In a telecommunication system using an orbiting satellite of 2,500 MHz in carrier frequency placed on a circular orbit of 700 km in altitude, for instance, the Doppler shifts will reach ±50 kHz as shown in FIG. 1. Therefore, the required frequency bandwidth for transmitting signals having a bit rate of 9.6 kbps by this communication system, which need not be more than about 20 kHz in the absence of the Doppler shift, should be increased to about 120 kHz, i.e. six times, if an allowance for the Doppler shifts is to be made. Therefore, the number of communication channels available for this communication system will correspondingly decrease. As a solution to this problem, a telecommunication system using a reference pilot signal for compensating for the Doppler shifts is proposed in the specification of the U.S. Pat. No. 4,191,923. In this telecommunication system, each slave ground station detects the Doppler shift amount with reference to the frequency and phase of the reference pilot signal from the master ground station, and corrects the carrier frequency so as to reduce that shift amount to zero. The aforementioned allowance for the Doppler shifts is thereby dispensed with and the number of available communication channels can be correspondingly increased, but many master ground stations would be required. Thus, since the orbiting satellite would need a master ground station in each geographical area matching the satellite-visible period, many master ground stations would have to be installed in different parts of the world. Therefore, it would invite an increase in required hardware for compensating for the Doppler shifts at the ground stations along with an increase in the scale of the telecommunication system, and the overall cost of the system would be thereby boosted.

BRIEF SUMMARY OF THE INVENTION

Object of the Invention

The object of the present invention, therefore, is to provide an economical store and forwarding system using orbiting satellites, improved in the efficiency of carrier frequency utilization without inviting any substantial increase in hardware either at the orbiting satellites or at the ground stations.

Summary of the Invention

According to the invention, there is provided an orbiting satellite-based telecommunication system having, between each orbiting satellite and a plurality of ground stations, a down link of a communication channel extending over a frequency band centering on a specific frequency and an up link of a plurality of communication channels extending over a frequency band wider than said frequency band for the down link, and providing store and forwarding service by having one of said ground stations, in response to a first instruction from said orbiting satellite through said down link, form a communication line to said orbiting satellite through an unused one of said plurality of communication channels, specified by said first instruction, in accordance with a packet protocol and supply transmit data to said orbiting satellite, and having another of said ground stations in response to a second instruction from said orbiting satellite through said down link, form a communication line to said orbiting satellite through an unused one of said plurality of communication channels, specified by said second instruction, in accordance with said protocol and receive said transmit data from said orbiting satellite, wherein said orbiting satellite is provided with dividing means for dividing the frequency band of said up link per communication channel into a plurality of subchannels on the basis of the Doppler shift amount of the frequency due to variations in the distance between a said ground station and said orbiting satellite; demodulator means for demodulating said transmit data on a subchannel-by-subchannel basis; and data processing means for processing said transmit data, demodulated on a subchannel-by-subchannel basis, by a predetermined procedure.

The invention makes it possible to make multiple communications channels substantially available in the allocated frequency band for the up link of the orbiting satellite.

BRIEF DESCRIPTION OF THE DRAWINGS

The above-mentioned and other objects, features and advantages of the present invention will become more apparent from the following detailed description when taken in conjunction with the accompanying drawings, wherein.

GENERAL DESCRIPTION

Figure 1:
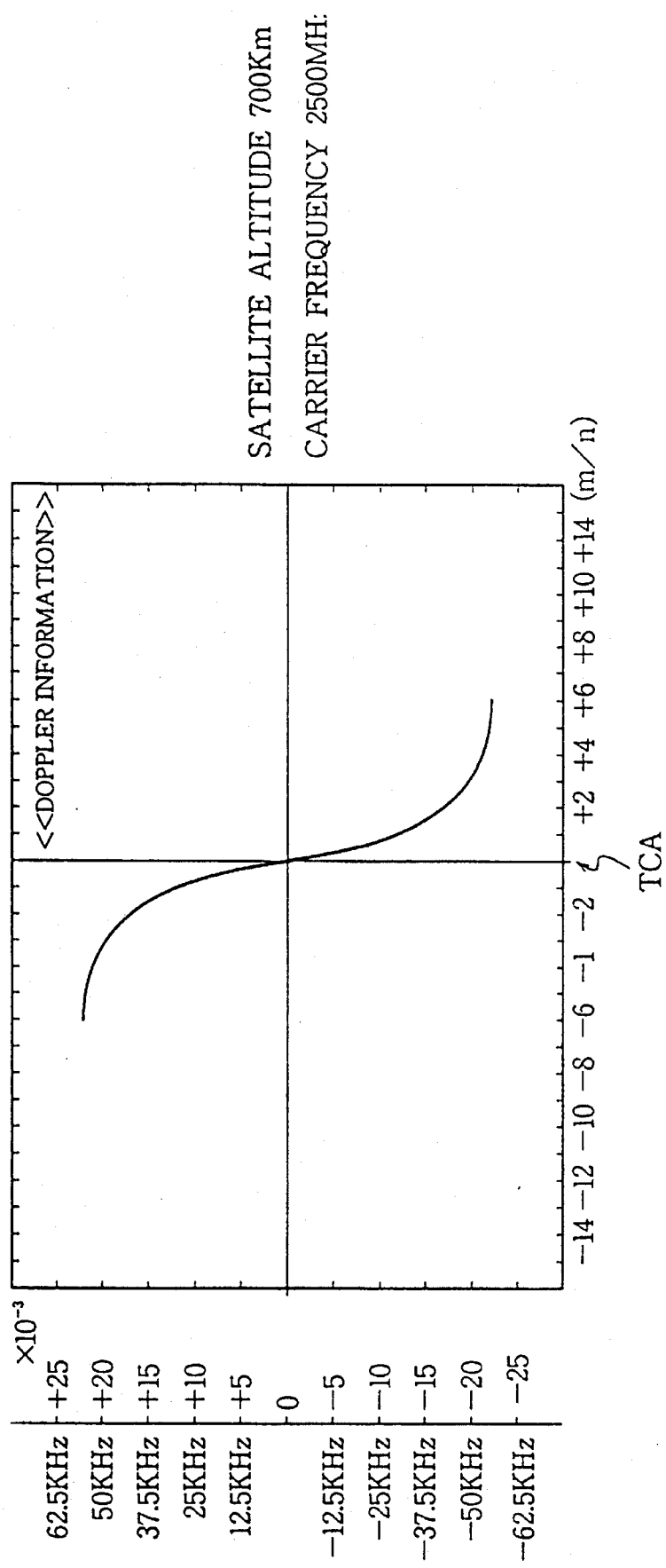
FIG. 1 illustrates variations in carrier frequency due to the Doppler effect as it pertains to the invention.
Figure 2:
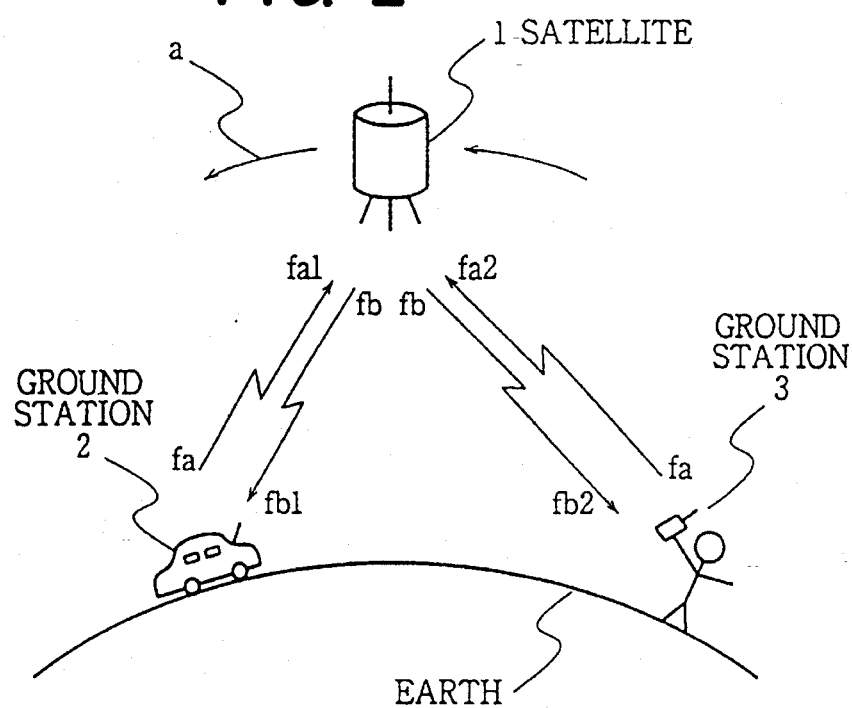
FIG. 2 is a schematic diagram of an orbiting satellite-based telecommunication system according to the invention.

Referring to FIG. 2 which schematically illustrates an orbiting satellite-based telecommunication system according to the invention, a user 2 located in a forward position on the earth surface relative to the flight course a of an orbiting satellite 1 exchanges data including speech signals with another user 3 located in a backward position on the earth surface relative to the flight course a by using a communication apparatus, to be described below, mounted on the satellite 1.

When both users 2 and 3 are transmitting at a carrier frequency $f_a$, the receive frequencies at the satellite 1 are varied by the Doppler effect, and the carrier frequency $f_a$ from the users 2 and 3 shift to $f_{a1}$ ($>f_a$) and to $f_{a2}$ ($<f_a$), respectively. Similarly, when both users 2 and 3 are receiving at a carrier frequency $f_b$, the frequencies at the users 2 and 3 shift to $f_{b1}$ ($>f_b$) and to $f_{b2}$ ($<f_b$), respectively. These frequency shifts are known as Doppler shifts.

Figure 3:
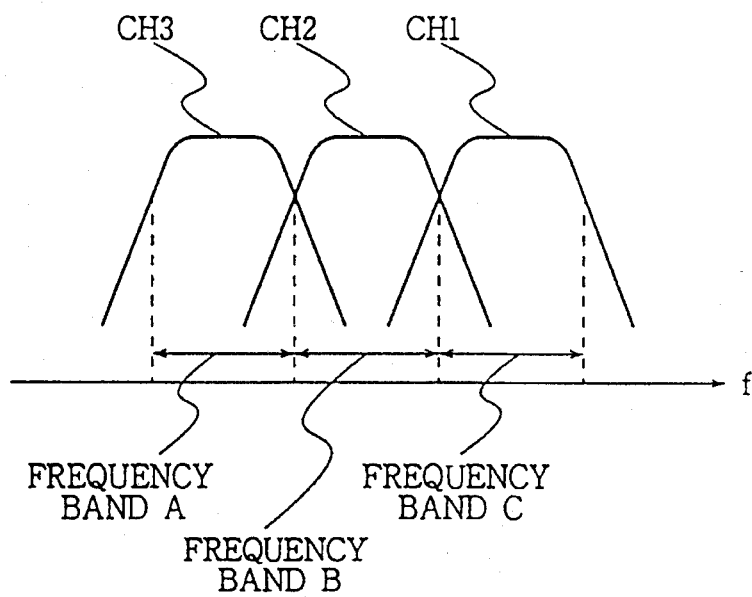
FIG. 3 illustrates an example of frequency allocation for communication channels in the telecommunication system according to the invention.

If the communication apparatus mounted on the satellite 1 can demodulate the carrier frequency $f_a$ and the carrier frequencies $f_{a1}$ and $f_{a2}$, both involving the Doppler shifts, separately from one another, the transmission bandwidth of the up link from the earth surface to the satellite 1 can be divided, as illustrated in FIG. 3, into frequency bands A, B and C, which can be allocated to three communication channels CH3, CH2 and CH1. In FIG. 3, the third channel CH3 (frequency band A) corresponds to the band centering on the frequency $f_{a2}$, the second channel CH2 (frequency band B), to the band centering on the frequency $f_a$, and the first channel CH1 (frequency band C), to the band centering on the frequency $f_{a1}$.

Figure 4:
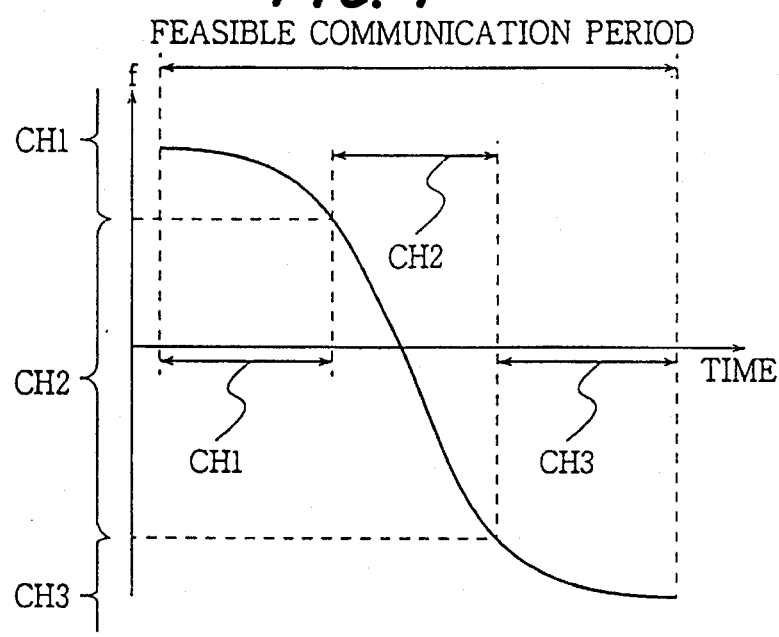
FIG. 4 illustrates the relationship between variations in carrier frequency due to the Doppler effect and the communication channels.

The frequency of the carrier from the satellite 1, observed at a point on the earth surface directly below the flight course of the orbiting satellite 1, as shown in FIG. 4, is higher at the beginning of the visible period, i.e. when the satellite 1 begins to become visible from that point, and lowers as the satellite 1 passes over the point and flies away. If these different frequencies are allocated to the first through third communication channels, the transmission and reception of signals will evidently become possible over each of these channels.

Figure 5:
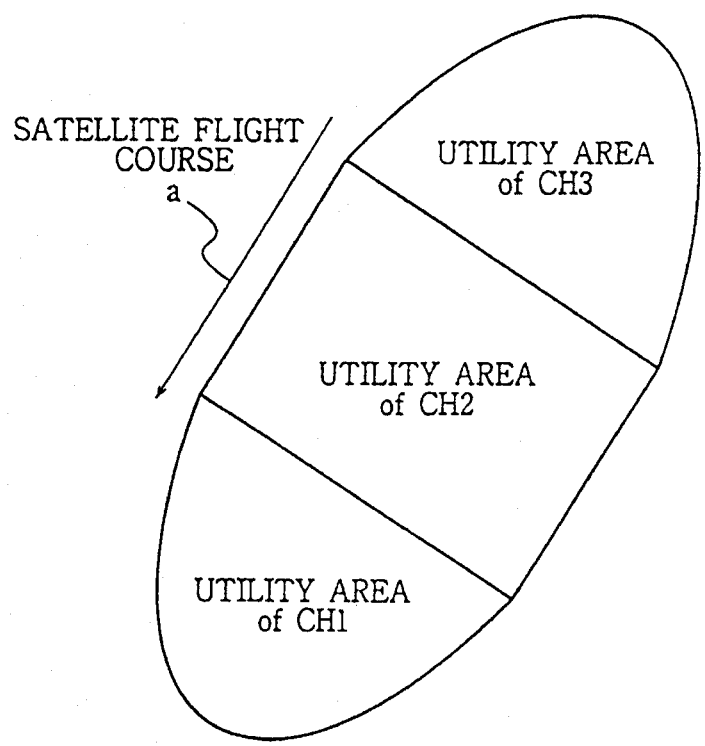
FIG. 5 illustrates the relationships between said communication channels and the service areas of the orbiting satellite.

Further referring to FIG. 5, in which the relationship between the frequency allocation utilizing the Doppler shifts occurring with the passage of the orbiting satellite and the service areas of this satellite is illustrated with respect to the point of time at which the satellite is positioned above the center of the utility area of the second channel CH2, the area forward in the flight direction a of the satellite is the utility area of the first channel CH1, and the area backward is that of the third channel CH3.

DETAILED DESCRIPTION

In the orbiting satellite-based telecommunication system according to the present invention illustrated in FIG. 2, the satellite 1 provides store and forwarding service to the ground stations 2 and 3 over the communication channels ch0, ch1, ch2 ... according to a predetermined frequency allocation. Here, the communication channel ch0 is used only for the down link for line management purposes, and is always in the transmission mode. Thus, this channel ch0 is used for line management functions including the transmission of the reference numbers of the unused ones among the communication channels, ch1, ch2 ... to the ground stations, and of transmission permit signals to permit ground stations to perform transmission over one or another of those unused channels.

The communication terminal apparatus at each ground station, upon receiving this transmission permit signal over the channel ch0, starts transmitting transmit messages over the unused channel indicated by the signal. Until the reception of this transmission permit signal, this ground station is not engaged in transmission. The procedure of line connection with the satellite to be taken when the ground station is to actually transmit signals to be transmitted conforms to the standard packet protocol of the ALOHA system.

While all the ground stations having received the transmission permit signals begin transmission in accordance with this packet protocol, the satellite 1, utilizing the Doppler shifts, connects lines with three ground stations including one in the utility area of the channel ch2 (FIG. 5) involving a point directly below the satellite, another in the utility area of the channel ch1 located forward in the flight direction of the satellite, and still another in the utility area of the channel ch3 located backward in the flight direction of the satellite. This presents a sharp contrast to such communication systems according to the prior art, wherein the up link is fully occupied by signals from a ground station close to a point directly below the satellite and the efficiencies of frequency utilization extremely deteriorate for both up and down links.

When the line connection between the satellite 1 and the ground stations 2 and 3 is completed through the aforementioned steps, each set of data, including information on the other party to the communication, from the ground stations 2 and 3 is written and stored by a satellite-mounted processor into a memory installed in the satellite. The satellite-mounted processor manages the destinations of data in the memory and, when the satellite 1 has reached a position above the destination area, calls the destination party over the line management channel ch0.

When the destination ground station has received this destination information over the channel ch0, data are received from the satellite 1 after line connection with the satellite 1 is achieved over an unused channel in accordance with the packet protocol by the same procedure as in the aforementioned case of receiving the transmission permit signal. The processor at the satellite 1, after perceiving the completion of data transmission at the end of the packet protocol, performs control so that the pertinent data can be deleted from the memory.

Figure 6:
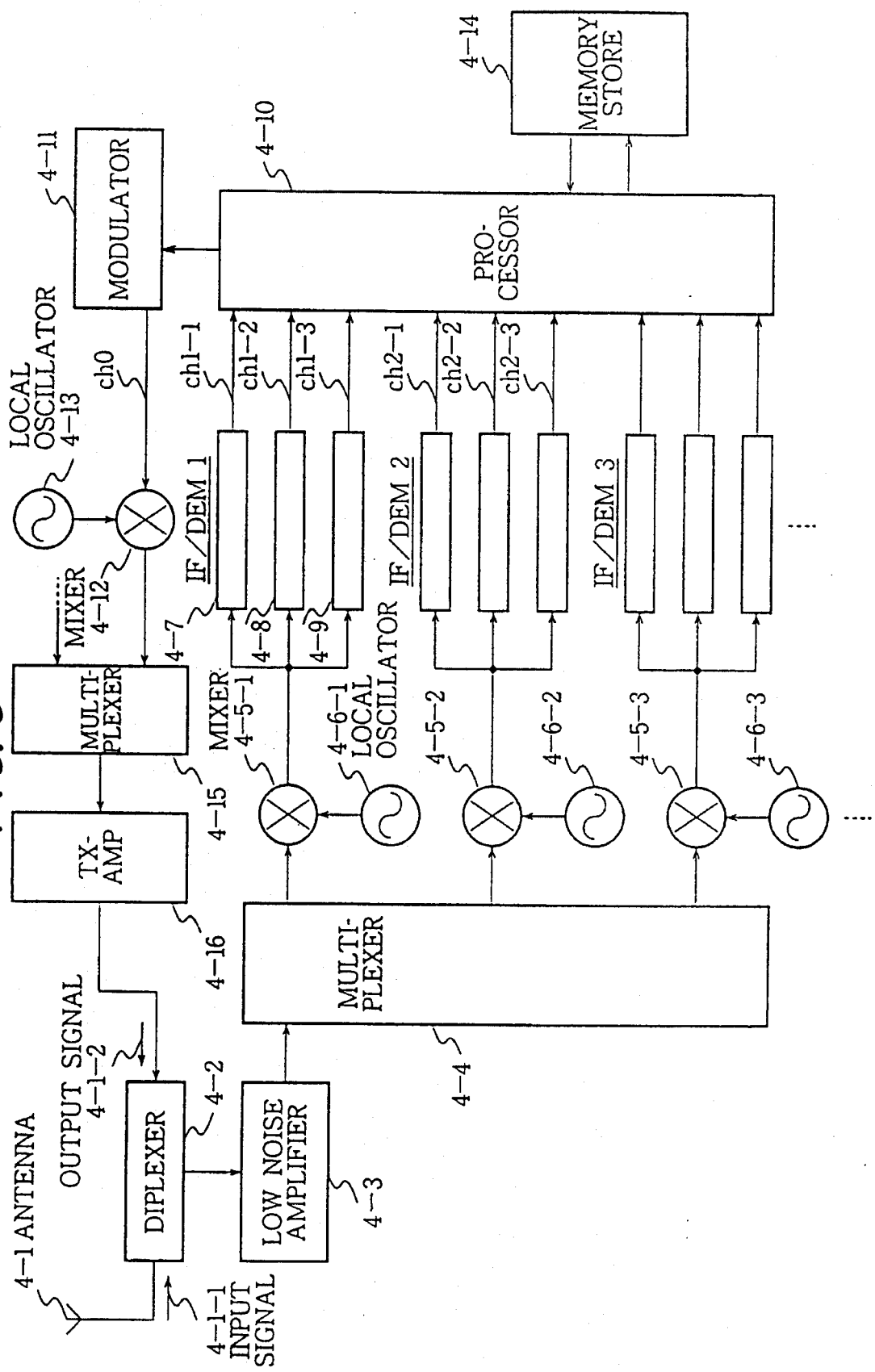
FIG. 6 is a block diagram of a satellite-mounted communication apparatus in a preferred embodiment of the invention.

Referring together to FIG. 6, which is a block diagram of a satellite-mounted communication apparatus in the preferred embodiment of the present invention, an input signal 4–1—1 from the antenna 4 of the satellite 1 is entered into a low noise amplifier 4–3 via a diplexer 4–2. Output signals from the low noise amplifier 4–3 undergo line separation by a multiplexer 4—4 among the channels ch1, ch2 ... of prescribed frequency bands, and are supplied to mixers 4–5–1, 4–5–2, 4–5–3 .... These mixers are supplied with local oscillation outputs from local oscillators 4–6–1, 4–6–2, 4–6–3 ... corresponding to the channels, respectively, and convert the line separation outputs into intermediate frequency (IF) signals. The outputs of these mixers 4–5–1, 4–5–2, 4–5–3 ... are further supplied to intermediate frequency demodulators IF/DEM1, IF/DEM2, IF/DEM3 ..., respectively. These IF demodulators IF/DEM1, IF/DEM2, IF/DEM3 ..., each consisting of three demodulator circuits 4–7, 4–8 and 4–9, supply the outputs, separated among three channels ch–1, ch–2 and ch–3 by Doppler shifting, to a memory 4–14 via a processor 4–10, and store them in the memory 4–14.

The read output signal of the memory 4–14, read out via the processor 4–10, is modulated by a modulator (MOD) 4–11, undergoes frequency conversion by a mixer 4–12 for receiving the oscillation output of a local oscillator 4–13 to the frequency of the channel ch–0, and supplied to an output amplifier (TX AMP) 4–16 via a multiplexer 4–15. The output signal 4–1–2 amplified by the output amplifier 4–16 to a prescribed output level is radiated by an antenna 4–1 toward ground stations via the diplexer 4–2.

Figure 7:
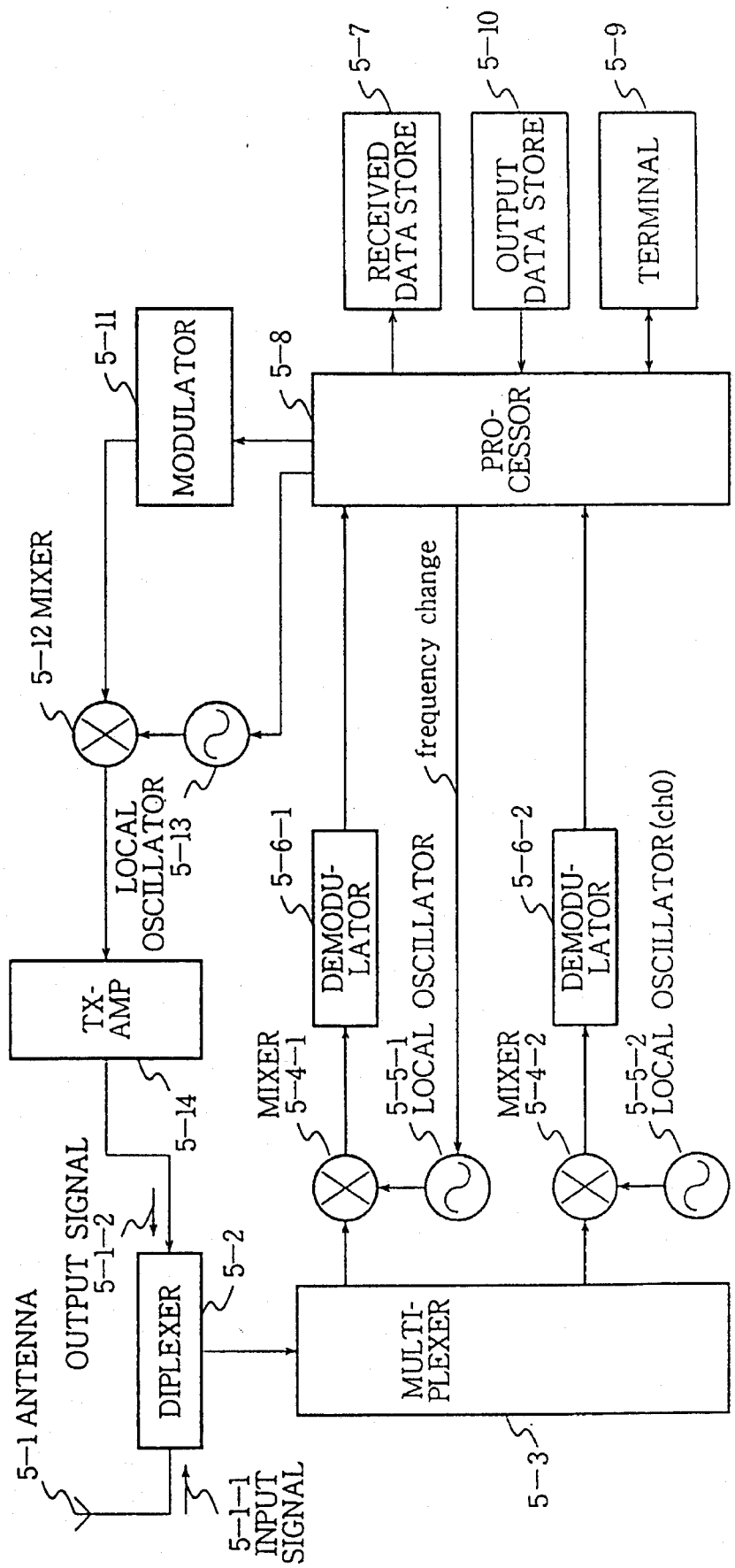
FIG. 7 is a block diagram of the communication terminal installed in each ground station in the preferred embodiment of the invention.

Referring now to FIG. 7, which is a block diagram of the communication terminal installed in each ground station, a receive signal 5–1—1 received at an antenna 5–1 is supplied to a multiplexer 5–3 via a diplexer 5–2. The multiplexer 5–3 separates this input signal for supply to a mixer 5–4–2 for the channel ch0 and a mixer 5–4–1 for an unused channel. The mixer 5–4–1 receives a local oscillation output from a local oscillator 5—5–1 for generating the local oscillation output of a frequency designated by a processor 5–8, converts the frequency of the receive signal to a prescribed IF, and supplies the converted signal to a demodulator (DEM) 5–6–1. The signal demodulated by the demodulator (DEM) 5–6–1 is written into a receive data memory 5–7 via the processor 5–8. Meanwhile the mixer 5–4–2, receiving the local oscillation output of the frequency of the channel ch0, converts the input frequency from the channel ch0 to a prescribed IF, and supplies the output to a demodulator (DEM) 5–6–2. The signal demodulated by the demodulator (DEM) 5–6–2 is supplied to the processor 5–8.

On the other hand, transmit data entered via an input/output terminal 5–9 are written into a transmit data memory 5–10 via the process 5–8. Output data read out of the processor 5–8 at the time of exchanging signals with the satellite 1 are modulated by a modulator (MOD) 5–11, and supplied to a mixer 5–12. Since the mixer 5–12 is supplied with a local oscillation output of a frequency designated by the processor 5–8 from a local oscillator 5–13, the output data are entered into an output amplifier (TX AMP) 5–14 after undergoing frequency conversion corresponding to this local oscillation frequency. The output signal 5–1–2, amplified by the output amplifier 5–14 to a prescribed level, is radiated from the antenna 5–1 via the diplexer 5–2 toward the satellite 1.

The satellite communication system according to the invention, including the satellite-mounted communication apparatus and the ground station apparatus respectively illustrated in FIGS. 6 and 7, operates as described below.

When the satellite 1 begins to accept requests from ground stations for store and forwarding service, the processor 4–10, after subjecting the transmission permit signal indicating the unused channel to frequency conversion by the mixer 4–12 to the frequency band of the channel ch0, radiates the signal via the multiplexer 4–15, the TX-AMP 4–16 and the diplexer 4–2 from the antenna 4–1.

Each ground station, upon receiving this transmission permit signal, subjects the signal to frequency conversion by the mixer 5–4–2 to the IF band of the channel ch0, demodulates it with the demodulator 5–6–2, and enters it into the processor 5–8. The processor 5–8, upon receiving this transmission permit signal over the channel ch0, supplies the local oscillator 5–13 with the unused channel number indicated by this transmission permit signal. Then, the processor 5–8, after subjecting a connection request signal to frequency conversion by the mixer 5–12 to the frequency band of the unused channel, radiates the signal via the TX-AMP 5–14 and the diplexer 5–2 from the antenna 5–1.

The satellite 1, after receiving this connection request signal at its antenna 4–1, subjects it to frequency conversion to an IF band by the mixers 4–5–1, 4–5–2 ... for receiving the local oscillation output corresponding to the designated unused channel via the diplexer 4–2 and the multiplexer 4—4, separates and demodulates it with the IF/DEM, and supplies the demodulated signal to the processor 4–10. When the unused channel is the channel ch1, a connection start signal is demodulated by one of the three demodulator circuits 4–7, 4–8 and 4–9. The choice of the demodulator circuit is determined by the position of the ground station, i.e. whether it is close to a point directly below the satellite or in an area forward or backward relative to its flight course.

The processor 4–10 of the satellite having received the connection request signal and the processor 5–8 of the ground station thereafter exchange signals in accordance with the packet protocol via the same route as at the time of transmitting and receiving the transmission permit signal, and connect the line.

Even if all the ground stations in the area corresponding to the frequency of the unused channel designated by the transmission permit signal (FIG. 5) begin transmitting connection request signals at the same time, one communication terminal in each of the three areas of FIG. 5 is connected to the satellite 1 because signals are transmitted and received in accordance with the packet protocol.

Upon completion of line connection between the satellite and the ground stations, data including destination information from the ground stations is written and stored into the memory 4–14 via the processor 4–10 of the satellite via the same route as for the connection request signals.

The processor 4–10, having control over the destinations of data in the memory, supplies a destination call signal over the channel ch0 when the satellite has reached the destination area as at the time of sending out the transmission permit signal.

The processor 5–8 of the destination ground station, as at the time of receiving the transmission permit signal, receives this destination call information over the channel ch0 and, after connecting the line to the satellite via an unused channel in accordance with the packet protocol by the same procedure and route as in the case of receiving the transmission permit signal, receives the data from the satellite and stores the received data in the receive data memory 5–7.

As hitherto described, in a telecommunication system according to the present invention, the efficiency of up link frequency utilization is improved, making it possible to increase the number of available channels and that of access terminals for random access to orbiting satellites.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as $f_{a1}$ within the true scope of the invention.

What is claimed is:

1. An orbiting satellite-based telecommunication system providing store and forwarding service and comprising an orbiting satellite and a plurality of ground stations and having respective down links from the orbiting satellite to the ground stations and respective up links from the ground stations to the orbiting satellite, the orbiting satellite including:

a first transmitting means for transmitting down link data through one of the respective down links to a corresponding one of the ground stations;

a first receiving means for receiving up link data transmitted through one of the respective up links by the corresponding one of the ground stations;

dividing means connected to the first receiving means for dividing a frequency band of a communication channel of the one of the respective up links into a plurality of subchannels in accordance with a Doppler shift amount of frequency caused by a variation in distance between the corresponding one of the ground stations and the orbiting satellite; and demodulation means connected to the dividing means for demodulating the up link data transmitted through the one of the respective up links from the corresponding one of the ground stations on a subchannel-by-subchannel basis; and each of the ground stations including:

a second transmitting means for transmitting the up link data through the respective one of the up links; and a second receiving means for receiving the down link data through the respective one of the down links, wherein one of the ground stations transmits the up link data to the orbiting satellite through a respective one of the up links in response to a first instruction transmitted from the orbiting satellite through a respective one of the down links, and another of the ground stations receives the down link data from the orbiting satellite in response to a second instruction transmitted from the orbiting satellite through a respective another of the down links.

2. An orbiting satellite-based telecommunication system as recited in claim 1, wherein the orbiting satellite further includes processing means connected to the demodulation means for processing the transmit data transmitted from the one of the ground stations.

3. An orbiting satellite-based telecommunication system as recited in claim 1, wherein the subchannels are respectively associated with a plurality of areas which constitute different ground locations below a flight path of the orbiting satellite.

4. An orbiting satellite-based telecommunication system as recited in claim 1, wherein the each of the ground stations further includes:

a second dividing means connected to the second receiving means for dividing a frequency band of a communication channel of a respective one of the down links into one of a first subchannel for receiving a transmission permit signal at a first down link frequency and a second subchannel for receiving down link data at a second down link frequency, wherein the second down link frequency corresponds to a value obtained from the transmission permit signal.

5. An orbiting satellite-based telecommunication system as recited in claim 2, wherein the orbiting satellite further includes memory means connected to the processing means for storing and holding the transmit data transmitted from the one of the ground stations to transmit the transmit data to the another of the ground stations.

6. An orbiting satellite-based communication method for providing store and forwarding service between a plurality of ground stations through an orbiting satellite, each of the plurality of ground stations comprising transmitting means and receiving means, the orbiting satellite comprising transmitting means and receiving means, the receiving means of the orbiting satellite including means for dividing a frequency band of an up link communication channel from one of the ground stations to the orbiting satellite into a plurality of subchannels in accordance with a Doppler frequency shift amount caused by a change in distance between the one of the ground stations and the orbiting satellite, and demodulating means for demodulating data received from the one of the ground stations on a subchannel-by-subchannel basis, the method comprising the steps of:

transmitting a first instruction from the orbiting satellite to the one of the ground stations;

transmitting up link data from the one of the ground stations to the orbiting satellite in response to the first instruction;

receiving the up link data from the one of the ground stations through one of the subchannels in the orbiting satellite;

storing and holding the up link data in a memory in the orbiting satellite until the orbiting satellite comes into an orbital position to make a down link communication line with another of the ground stations;

transmitting a second instruction and the up link data held in the memory of the orbiting satellite to the another of the ground stations over the down link communication line; and receiving the up link data held in the memory of the orbiting satellite in the another of the ground stations in accordance with the second instruction.

7. A satellite for providing store and forwarding service to a plurality of ground stations over respective down links from the satellite in orbit to the ground stations and over respective up links from the ground stations to the satellite in orbit, the satellite comprising:

transmitting means for transmitting down link data through one of the respective down links to a corresponding one of the ground stations;

receiving means for receiving up link data transmitted through one of the respective up links by the corresponding one of the ground stations;

dividing means connected to the receiving means for dividing a frequency band of a communication channel of one of the respective up links into a plurality of subchannels in accordance with a Doppler shift amount of frequency caused by a variation in distance between the respective one of the ground stations and the satellite in orbit;

demodulation means connected to the dividing means for demodulating the up link data transmitted through the one of the respective up links from the respective one of the ground stations on a subchannel-by-subchannel basis; and a means for issuing a first and second instruction; wherein one of the ground stations transmits the up link data to the satellite in orbit through a respective one of the up links in response to the first instruction transmitted from the satellite in orbit through a respective one of the down links, and another of the ground stations receives the down link data from the satellite in orbit in response to the second instruction transmitted from the satellite in orbit through a respective another of the down links.

8. A first ground station for receiving store and forwarding data from a second ground station via a satellite in orbit, the first and second ground stations sending up link signals to the satellite in orbit by respective up links, and the satellite in orbit sending down link signals to the first and second ground stations by respective down links, the first ground station comprising:

receiving means for receiving the down link signals at a radio frequency through the respective one of the down links from the satellite in orbit;

converting means connected to the receiving means for converting the frequency of the down link signals to an intermediate frequency;

demodulation means connected to the converting means for demodulating the down link signals at the intermediate frequency to down link data;

transmitting means for transmitting up link data through the respective one of the up links to the satellite in orbit, wherein the first ground station transmits the up link data to the satellite in orbit through a respective one of the up links by the transmitting means of the first ground station in response to a first instruction transmitted from the satellite in orbit through a respective one of the down links, and the second ground station receives the down link data from the satellite in orbit by the receiving means of the second ground station in response to a second instruction transmitted from the orbiting satellite through a respective another of the down links, and wherein the converting means converts a frequency band of a communication channel of the one of the respective up links into a plurality of subchannels in accordance with a Doppler shift amount of frequency caused by a variation in distance between the first and second ground stations and the satellite in orbit.

* * * * *